United States Patent Office 3,720,726
Patented Mar. 13, 1973

3,720,726
TRANSALKYLATION OF ALKYLAROMATIC HYDROCARBONS IN CONTACT WITH A ZEOLITE CATALYST COMPOSITION
Roy T. Mitsche, Island Lake, and Edward Michalko, Lombard, Ill., assignors to Universal Oil Products Company, Des Plaines, Ill.
No Drawing. Continuation-in-part of application Ser. No. 20,024, Mar. 16, 1970. This application Mar. 27, 1972, Ser. No. 238,622
Int. Cl. C07c 3/62
U.S. Cl. 260—672 T    8 Claims

ABSTRACT OF THE DISCLOSURE

A process for the transalkylation of alkylaromatic hydrocarbons. Transalkylation of alkylaromatic hydrocarbons, such as toluene, is effected at transalkylation conditions in contact with a catalyst comprising from about 60 to about 90% of a zeolite having a mordenite crystal structure containing alumina fixed in combination therewith. The catalyst is characterized by a method of preparation.

This application is a continuation-in-part of a copending application Ser. No. 20,024, filed Mar. 16, 1970.

Crystalline aluminosilicates, or zeolites, are well known in the art and have found extensive application as hydrocarbon conversion catalysts or as a component thereof. Such materials are of an ordered crystalline structure comprising cages or cavities interconnected by smaller pores and channels of a definite size range characteristic of each crystalline aluminosilicate variety. Since the dimensions of the pores and channels are such as to accept molecules of certain dimension while rejecting those of larger dimension, these materials have come to be known as molecular sieves and utilized in many ways taking advantage of these properties.

The crystalline aluminosilicates, hereinafter referred to as zeolites, are generally described as a three-dimensional network of fundamental structural units consisting of silicon-centered $SiO_4$, and aluminum-centered $AlL_4$, tetrahedral interconnected by a mutual sharing of apical oxygen atoms. To effect a chemical balance, each $AlO_4$ tetrahedra has a cation associated therewith, usually sodium. In most cases, the cation is subsequently exchanged with a hydrogen ion to yield the hydrogen or active form of the zeolite.

The $SiO_4$ and $AlO_4$ tetrahedra are arranged in a definite geometric pattern often visualized either in terms of chains, layers or polyhedra, all formed by the linking of the tetrahedra. In any case, the zeolites comprise well-defined intracrystalline dimensions including intracrystalline channels and pore openings whose narrowest cross section has essentially a uniform diameter. The various zeolites may be classified according to the geometric pattern of their framework with its attendant pore size, and by the $SiO_2/Al_2O_3$ mole ratio of their composition.

Mordenite is a particular zeolite, highly siliceous in nature, and generally characterized by a $SiO_2/Al_2O_3$ mole ratio of from about 6 to about 12 as manufactured or found in its natural state. The mordenite crystal structure comprises four and five membered rings of $SiO_4$ and $AlO_4$ tetrahedra so arranged that the resulting crystal lattice comprises pores and channels running parallel along the crystal axis to give a tubular configuration. This structure is unique among the zeolites since the channels or tubes do not intersect and access to the cages or cavities is in only one direction. For this reason, the mordenite structure is frequently referred to as two-dimensional. This is in contrast to other well-known zeolites, for example faujasite and Zeolite A, in which the cages can be entered from three directions.

Conventional mordenite exhibits an unusual acid stability attributed to its siliceous nature, and the $SiO_2/Al_2O_3$ mole ratio of conventional mordenite can be further increased to as much as 50:1 or more by the technique of acid-leaching alumina therefrom while maintaining the mordenite crystal structure. Compositions comprising mordenite, caustic and acid extracted mordenite, mordenite supported on or dispersed in a carrier material, and other variations and combinations of mordenite, have been prepared, often as catalysts for specific hydrocarbon conversion reactions. However, the art has not heretofore disclosed the catalyst composition of this invention comprising a zeolite having the mordenite crystal structure and containing alumina fixed in combination therewith. Other zeolites having the mordenite crystal structure and of substantially the same $SiO_2/Al_2O_3$ mole ratio as herein contemplated, can be prepared by prior art methods, e.g. leaching of alumina from conventional mordenite. However, said zeolites do not yield the improved catalyst composition of this invention. Thus, the catalyst composition of this invention is characterized by a method of preparation, the novelty and utility of the catalyst composition being evidenced by its extraordinary activity and stability as a catalyst with respect to the transalkylation or disproportionation of alkylaromatic hydrocarbons.

The transalkylation or disproportionation of alkylaromatic hydrocarbons is of particular importance in conjunction with catalytic reforming. In recent years, largely due to the success and growth of catalytic reforming and improved methods of separating and recovering aromatic hydrocarbons produced thereby, the petroleum industry has become a principal source of benzene, toluene, and other aromatic and alkylaromatic hydrocarbons. The supply and demand for specific aromatic hydrocarbons varies from time to time. For example, it is not uncommon to find toluene in excess of demand while benzene is in short supply. To obviate this situation, it is desirable to treat the toluene at transalkylation or disproportionation reaction conditions whereby one molecule is alkylated at the expense of another molecule which is dealkylated to yield benzene and xylenes or other polymethylated benzenes.

It is an object of this invention to present an improved process for the transalkylation of alkylaromatic hydrocarbons utilizing the novel composition as a catalyst therefor.

In one of its broad aspects, the present invention embodies a process for the transalkylation of an alkylaromatic hydrocarbon which comprises treating an alkylaromatic hydrocarbon having from about 7 to about 15 carbon atoms per molecule in admixture with from about 1 to about 10 moles of hydrogen per mole of hydrocarbon at transalkylation conditions including a temperature of from about 200° to about 480° C., in contact with a catalyst comprising from about 60 to about 90 wt. percent of a zeolite having a mordenite crystal structure and containing alumina fixed in combination therewith, said catalyst composition having been prepared by (1) heating an amorphous silica-alumina composite at a temperature of from about 140° to about 250° C. in a closed vessel in admixture with an aqueous alkali metal solution, said composite being characterized by a $SiO_2/Al_2O_3$ mole ratio of from about 10 to about 30, and said solution having an alkali metal concentration sufficient to provide an alkali metal/aluminum ratio of from about 1.5 to about 3.5, and forming a zeolite with a mordenite crystal structure and of substantially the same $SiO_2/Al_2O_3$ mole ratio as the amorphous silica-alumina starting material, and (2) heating said zeolite in an alumina sol, thereafter separating excess sol, treating the zeolite-sol product at conditions effecting gelation of the sol, aging the resulting composition in an alkaline media for a period of at least about 5 hours and washing, drying and calcining. Other objects and embodiments of this invention will become apparent with reference to the following detailed specification.

In the manufacture of the catalyst composition of this invention, the zeolite component is initially prepared to comprise a $SiO_2/Al_2O_3$ mole ratio of from about 12 to about 30, and preferably from about 15 to about 25. This is in contrast to conventional mordenite, either naturally occurring or synthetically prepared, which is generally characterized by a $SiO_2/Al_2O_3$ mole ratio of from about 6 to about 12. The zeolite herein employed is initially prepared to comprise the desired $SiO_2/Al_2O_3$ mole ratio by utilizing an amorphous silica-alumina composite as a starting material, the amorphous silica-alumina composite being of substantially the same $SiO_2/Al_2O_3$ mole ratio as that desired in the zeolite product. A convenient source of amorphous silica-alumina starting material is conventional amorphous silica-alumina cracking catalyst of less than about 13 wt. percent alumina. Said catalyst is typically manufactured by a series of process steps involving initially the formation of an acidic silica sol by acidification of an aqueous sodium silica solution (water glass). It has been observed that silica-alumina, wherein the silica has been derived from an acidic silica sol, gives an improved rate of reaction in the formation of the zeolite as herein contemplated. Subsequent process steps in the manufacture of said cracking catalyst include gelation of the silica sol after which the resulting slurry is adjusted to a pH of about 3.5 and impregnated with an aluminum salt solution, usually an aqueous aluminum sulfate solution, the aluminum sulfate being thereafter hydrolyzed and precipitated. The silica-alumina product is commonly slurried with water and spray-dried to yield fine silica-alumina microspheres particularly suitable as a starting material in the manufacture of the zeolite component of the catalyst composition of this invention.

While an amorphous silica-alumina composite wherein the silica is derived from an acidic silica sol is preferred, an amorphous silica-alumina composite wherein the silica is derived from a basic silica sol may also be utilized. For example, silica-alumina cogels are often prepared by admixing an aqueous sodium silicate solution or sol with an acidic aluminum sulfate solution to form a sol blend with a pH in excess of about 7. The blend is substantially immediately dispersed as droplets in a hot oil bath, aged therein at elevated temperature, water-washed, dried and calcined.

Regardless of the derivation of the amorphous silica-alumina starting material, the silica-alumina composite is heated in admixture with an aqueous alkali metal solution at a temperature of from about 140° to about 250° C. in a closed vessel. The alkali metal solution has an alkali metal concentration sufficient to provide an alkali metal/aluminum ratio of from about 1.5 to about 3.5 in the reaction mixture. The alkali metal is usually sodium, the alkali metal solution being suitably an aqueous sodium hydroxide solution. Zeolite yields of 90–100% are obtained after the stirred reaction mixture has been heated for a period of from about 8 to about 24 hours. The zeolite product thus prepared is characterized by a $SiO_2/Al_2O_3$ mole ratio substantially the same as the amorphous silica-alumina starting material. While the zeolite may be converted to the hydrogen form by conventional ion-exchange techniques prior to treating with the alumina sol, no particular improvement results therefrom and the zeolite is suitably and conveniently utilized in the sodium form.

As will become apparent with reference to the method of preparation hereinafter presented, the composition of this invention comprises a zeolite having a mordenite crystal structure and containing alumina fixed in physical and/or chemical combination therewith in contrast to the conventional practice of suspending the zeolite in a refractory oxide. Thus, the present invention does not contemplate the presence of any substantial amount of extraneous alumina in the claimed composition. In another embodiment of this invention relating to a method of preparing said composition, the zeolite, characterized by a $SiO_2/Al_2O_3$ mole ratio of from about 10 to about 30 and pore openings of from about 3 to about 8 angstroms, is heated in admixture with an alumina sol, said zeolite being admixed with said sol prior to being dried at a temperature in excess of about 300° C. The supernatant or extraneous sol is thereafter separated and the zeolite-alumina sol product treated at conditions effecting gelation of the sol. The zeolite-alumina gel product is thereafter aged in an alkaline medium, washed and dried.

The zeolite is suitably heated in admixture with the alumina sol at a temperature of from about 50° to about 150° C. at conditions to obviate any substantial loss of water. Thus, the zeolite and alumina sol may be heated together in a closed vessel. Preferably, the zeolite and alumina sol are heated together at a temperature of from about 75° to about 125° C. for a period of at least about 10 hours, and preferably at a temperature of from about 75° to about 125° C. for a period of from about 20 to about 100 hours. The alumina sol is preferably, although not necessarily, an aluminum chloride sol such as is prepared by digesting aluminum metal in an acidic reagent such as hydrochloric acid and/or aqueous aluminum chloride at about the boiling point of the mixture—usually a temperature of from about 80° to about 105° C. However, alumina sols derived from other aluminum salts such as aluminum sulfate, aluminum nitrate, sodium aluminumate, etc., can be employed.

The supernatant or extraneous alumina sol is decanted, filtered or otherwise separated from the zeolite-alumina sol product which is subsequently treated at conditions effecting gelation of the reacted sol. Preferably, the zeolite-alumina sol product is treated in contact with an aqueous ammonia solution whereby gelation of the sol occurs and the zeolite-gel product aged for a period of at least about 5 hours and preferably for a period of from about 10 to about 24 hours in the alkaline solution to achieve optimum activity of the final catalyst composition. The resulting zeolite-alumina gel product is usually water-washed and dried at a temperature of from about 95° to about 300° C. for a period of from about 2 to about 24 hours or more. The dried zeolite-alumina gel product may then be pilled or extruded using known techniques to obtain particles of the desired shape or size.

When the composition is to be employed as a catalyst, it is advantageously further calcined at a temperature of from about 400° to about 600° C. in an air atmosphere for a period of from about 0.5 to about 10 hours. The activity of the composition as a catalyst is favored by calcination in air containing from about 1 to about 5 wt. percent water at a temperature of from about 400° to about 600° C., and thereafter in a substantially dry atmosphere at said temperature.

It has been found that when, as aforesaid, zeolite is admixed with the alumina sol prior to being dried at a temperature in excess of about 300° C. and preferably prior to being dried at a temperature in excess of about 110° C., so as to retain volatile matter in excess of about 15%, the zeolite embodies a peculiar affinity for alumina not otherwise observed. This peculiar affinity is evidenced by a greater capacity of the zeolite for alumina fixed in physical and/or chemical combination therewith as herein contemplated. The peculiar affinity is further evident from the catalytic effect of the composition with respect to the aforementioned transalkylation reaction—a more than two-fold increase in activity and stability being realized.

The present invention further embodies a process which comprises treating an aromatic hydrocarbon having from about 7 to about 15 carbon atoms per molecule at transalkylation conditions including a temperature of from about 200° to about 480° C. and a pressure of from about atmospheric to about 1500 pounds per inch gauge (p.s.i.g.) in contact with a catalyst comprising essentially the composition of this invention and forming products of higher and lower number of carbon atoms than said alkylaromatic hydrocarbon. The preferred composition employed as a catalyst comprises a zeolite having the mordenite crystal structure and containing alumina fixed in combination therewith, said zeolite comprising from about 50 to about 75 wt. percent of said composition.

The alkylaromatic hydrocarbon feed stock treated in accordance with the present process can be a substantially pure alkylaromatic hydrocarbon of from about 7 to about 15 carbon atoms, a mixture of such alkylaromatic hydrocarbons or a hydrocarbon fraction rich in said alkylaromatics. Suitable alkylaromatic hydrocarbons include alkylbenzenes and alkylnaphthalenes, preferably with an alkyl group of less than about 4 carbon atoms. The process is particularly applicable to the treatment of the more difficultly transalkylatable toluene to form benzene and xylenes or other polymethylbenzenes.

The transalkylation, or disproportionation, reaction of this invention can be effected in contact with the catalyst composition of this invention in any conventional or otherwise convenient manner and may comprise a batch or continuous type operation. A preferred type of operation is of the continuous type. For example, the above-described catalyst is disposed in a fixed bed in a reaction zone of a vertical tubular reactor and the alkylaromatic feed stock charged in an upflow or downflow manner, the reaction zone being maintained at a temperature of from about 200° to about 480° C., preferably at a temperature of from about 220° to about 460° C. While pressure does not appear to be an important variable with respect to the transalkylation reaction of this invention, the process is generally conducted in a presence of an imposed hydrogen pressure to provide from about 1 to about 10 moles of hydrogen per mole of hydrocarbon. However, there is no net consumption of hydrogen in the process, and the hydrogen charge is recovered from the reactor effluent and recycled.

The transalkylation reaction can be effected over a wide range of space velocities. In general, the process is conducted at a space velocity of from about 0.2 to about 10. Space velocities herein referred to are liquid hourly space velocities, (LHSV) i.e., volume of charge per volume of catalyst per hour. While the present process is characterized by unusually high space velocities indicative of high activity, it is particularly noteworthy because of its relatively high stability of the catalyst at a high activity level.

The composition herein disclosed may be employed as a component of a catalyst comprising any of the several catalytically active metallic materials in the oxidized or reduced state. Of particular interest are those catalytic composites comprising one or more metals of Group VIB and VIII including molybdenum, tungsten, chromium, iron, nickel, cobalt, platinum, palladium, ruthenium, rhodium, osmium and iridium. Thus, the composition of this invention can be utilized advantageously as a catalyst or component thereof to effect a variety of hydrocarbon conversion reactions involving reaction conditions comprising a temperature in the 70–1400° F. range. The catalysts are particularly useful in effecting the hydrocracking of heavy oils, including vacuum residuals, to form petroleum products in the middle distillate range utilizing a temperature of from about 500° to about 3000° F. and pressures of from about 500 to about 1000 p.s.i.g. Said hydrocarbon conversion reactions further include polymerization of olefins, particularly ethylene, propylene, 1-butene, 2-butene, isobutylene and also higher boiling olefins, at polymerization reaction conditions. The composition of this invention is also useful as a catalyst or component thereof in effecting the alkylation of isoparaffins with olefins or other alkylating agents including, for example, alkylhalides and the like; and also the alkylation of isobutane, isopentane, and/or isohexane with ethylene, propylene, 1-butene, etc., or mixtures thereof; and also the alkylation of aromatics with olefins or other alkylating agents, particularly the alkylation of benzene, toluene, etc., with propylene, butylene, and higher boiling olefins including nonenes, decenes, undecenes, etc., the foregoing alkylation reactions being effected at alkylation conditions disclosed in the art. The composition of this invention is further useful in the isomerization of paraffins, particularly n-butane, n-pentane, n-hexane, n-heptane, n-octane, etc., or mixtures thereof, including isomerization of less highly branched chain saturated hydrocarbons to more highly branched chain saturated hydrocarbons such as the isomerization of 2- or 3-methylpentane to 2,2- and 2,3-dimethylbutane, isomerization of naphthenes, for example, the isomerization of dimethylcyclopentane to methylcyclohexane, isomerization of methylcyclopentane to cyclohexane, etc. at isomerization reaction conditions. Other hydrocarbon conversion reactions including the reforming of naphtha to gasoline, dehydrogenation of ethylbenzene to styrene, and the hydrogenation of benzene to cyclohexene, are effectively catalyzed utilizing the composite of this invention as a catalyst or component thereof.

The following examples are presented in illustration of the present invention and are not intended as an undue limitation on the generally broad scope of the invention as set out in the appended claims.

EXAMPLE I

In the manufacture of the zeolite component of the catalyst composition of this invention, an amorphous silica-alumina, characterized by a $SiO_2/Al_2O_3$ mole ratio of 20.0, was utilized as a starting material. The amorphous material was prepared by the acidification of 23.6 liters of 6.9% aqueous water glass solution with 2.99 liters of 25% sulfuric acid, the final pH being about 4.3. Gelation occurred in about 10 minutes, and 175 cc. of a 15% aqueous ammonia solution was added to the resulting slurry to adjust the pH to about 7.7, the temperature being maintained at about 35° C. After about one hour, 200 cc. of 25% sulfuric acid was added lowering the pH to 6.5. A preneutralized aluminum sulfate solution, prepared by blending 700 cc. of a 28% aqueous ammonia solution with 2800 cc. of an aqueous aluminum sulfate solution (comprising the equivalent of 6.7 wt. percent $Al_2O_3$), was added to the aqueous silica slurry with stirring, the pH being further lowered to about 3.9. Hydrolysis of the aluminum sulfate was effected at a pH of about 6.5 by the addition of 810 cc. of a 15% aqueous ammonia solution. After one hour at said pH, the mixture was filtered, reslurried in water and spray-dried.

450 grams of the spray-dried silica-alumina microspheres (400 grams V.F., 7.83 wt. percent $Al_2O_3$) were admixed with 57.0 grams of sodium hydroxide in aqueous solution (1500 cc.) and sealed in an autoclave. The autoclave was rotated and heated to a temperature of 200° C. over a two-hour period and further rotated and heated at 200° C. for 12 hours. The reaction mixture was cooled and filtered to recover the solids product. The product was washed and dried in the described manner. X-ray analyses indicated the product to be 95% zeolite with a $SiO_2/Al_2O_3$ mole ratio of 19.7 and a mordenite crystal structure.

About 150 grams of said zeolite was heated in about 700 cc. of an aluminum chloride hydrosol using a glass vessel equipped with an overhead reflux condenser. The aluminum chloride hydrosol comprised 12.49 wt. percent alumina, 10.75 wt. percent chloride, and had a specific gravity of 1.3630. The mixture was heated for about 24 hours at reflux conditions (95–100° C.). Thereafter, the zeolite sol product was recovered by filtration. The zeolite-sol product included about 270 cc. (86.4 grams $Al_2O_3$) of sol. The zeolite-sol product was slurried with a 15% aqueous ammonia solution for about one hour and aged in the solution overnight at 95° C. The resulting zeolite-gel product was thereafter further washed with dilute aqueous ammonia until the filtrate was chloride-free. The product was oven-dried at 110° C., pilled and calcined. Calcination consisted in heating the product in air containing 3% water for one hour at 550° C. and thereafter in dry air for one hour at 550° C. X-ray analysis indicated the final product to comprise 50 wt. percent zeolite of the mordenite crystal structure and 42% alumina.

EXAMPLE II

The activity and stability of the catalyst composition of Example I was determined with respect to the transalkylation of toluene. The toluene was charged downflow in contact with the catalyst composition at a liquid hourly space velocity of about 5 and at transalkylation conditions including a pressure of 500 p.s.i.g., a temperature of 420° C. and a hydrogen to hydrocarbon ratio of 10. The catalyst bed measured 50 cc. of ⅛ inch pills. During an initial test period of about 10 hours, a 50% conversion of toluene per pass was achieved. The product included 50 wt. percent unconverted toluene, 20 wt. percent benzene, 23 wt. percent xylene, and 4.5 wt. percent $C_9$ hydrocarbons. After approximately 90 hours on stream, a catalyst sampling indicated 0.29 wt. percent carbon on the catalyst. After about 184 hours on stream at approximately the same transalkylation conditions, the toluene conversion and the product distribution was substantially unchanged.

We claim as our invention:

1. A process for the transalkylation of alkylaromatic hydrocarbons which comprises treating an alkylaromatic hydrocarbon having from about 7 to about 15 carbon atoms per molecule in admixture with from about 1 to about 10 moles of hydrogen per mole of hydrocarbon at transalkylation conditions, including a temperature of from about 200° to about 480° C., in contact with a catalyst comprising from about 60 to about 90 wt. percent of a zeolite having a mordenite crystal structure and containing alumina fixed in combination therewith, said catalyst having been prepared by (1) heating an amorphous silica-alumina composite at a temperature of from about 140° C. to about 250° C. in a closed vessel in admixture with an aqueous alkali metal solution, said composite being characterized by a $SiO_2/Al_2O_3$ mole ratio of from about 10 to about 30, and said solution having an alkali metal concentration sufficient to provide an alkali metal/aluminum ratio of from about 1.5 to about 3.5, and forming a zeolite with a mordenite crystal structure and of substantially the same $SiO_2/Al_2O_3$ mole ratio as the amorphous starting material, and (2) heating said zeolite in an alumina sol, thereafter separating excess sol, treating the zeolite-sol product at conditions effecting gelation of the sol, aging the resulting composition in an alkaline media for at least about five hours, and washing, drying and calcining the aged composite.

2. The method of claim 1 further characterized in that the alkyl substituent of said alkylaromatic hydrocarbon comprises less than 4 carbon atoms.

3. The method of claim 1 further characterized in that said alkylaromatic hydrocarbon is toluene.

4. The method of claim 1 further characterized in that said transalkylation conditions include a temperature of from about 220° to about 460° C.

5. A process for the transalkylation of an alkylaromatic hydrocarbon which comprises treating an alkylaromatic hydrocarbon having from about 7 to about 15 carbon atoms per molecule in admixture with from about 1 to about 10 moles of hydrogen per mole of hydrocarbon at transalkylation conditions, including a temperature of from about 200° to about 480° C., in contact with a catalyst comprising from about 60 to about 90 wt. percent of a zeolite having a mordenite crystal structure and containing alumina fixed in combination therewith, said catalyst having been prepared by (1) heating an amorphous silica-alumina composite at a temperature of from about 140° C. to about 250° C. in a closed vessel in admixture with an aqueous sodium hydroxide solution, said composite being characterized by a $SiO_2/Al_2O_3$ mole ratio of from about 12 to about 25, and said solution having a sodium concentration sufficient to provide a sodium/alumina ratio of from about 1.5 to about 3.5, and forming a zeolite with a mordenite crystal structure and of substantially the same $SiO_2/Al_2O_3$ mole ratio as the amorphous starting material, (2) heating said zeolite in an alumina chloride sol at a temperature of from about 75° to about 125° C. for a period of from about 20 to about 100 hours prior to said zeolite being dried at a temperature in excess of about 300° C., thereafter separating excess sol, treating the zeolite-sol product at conditions effecting gelation of the sol, aging the resulting composition in an aqueous ammonia solution for from about 10 to about 24 hours at a temperature of from about 75° to about 100° C., and washing, drying and calcining the aged composition at a temperature of from about 400° to about 600° C. in air containing from about 1 to about 5 wt. percent water, and thereafter in a substantially dry atmosphere at said temperature of from about 400° to about 600° C.

6. The method of claim 5 further characterized in that the alkyl substituent of said alkylaromatic hydrocarbon comprises less than about 4 carbon atoms.

7. The method of claim 5 further characterized in that said alkylaromatic hydrocarbon is toluene.

8. The method of claim 5 further characterized in that said transalkylation conditions include a temperature of from about 220° to about 460° C.

References Cited

UNITED STATES PATENTS

| | | | |
|---|---|---|---|
| 3,436,174 | 4/1969 | Sand | 23—113 |
| 3,562,345 | 2/1971 | Mitsche | 260—672 T |

CURTIS R. DAVIS, Primary Examiner